United States Patent [19]

Gibson et al.

[11] 4,278,729
[45] Jul. 14, 1981

[54] PRODUCTION OF CARBON FIBER-TANTALUM CARBIDE COMPOSITES

[76] Inventors: James O. Gibson; Mark G. Gibson, both of 871 El Oro La., Pacific Palisades, Calif. 90272

[21] Appl. No.: 95,158

[22] Filed: Nov. 19, 1979

Related U.S. Application Data

[62] Division of Ser. No. 942,485, Sep. 15, 1978, Pat. No. 4,196,230.

[51] Int. Cl.³ .................. B32B 9/00; D02G 3/00
[52] U.S. Cl. .................. 428/368; 428/367; 428/378; 428/389; 428/408; 428/539.5; 428/472; 75/229
[58] Field of Search ............. 428/367, 368, 373, 375, 428/408, 379, 389, 378, 538, 539

[56] References Cited

U.S. PATENT DOCUMENTS

| | | | |
|---|---|---|---|
| 3,713,865 | 1/1973 | Leeds | 428/367 |
| 3,736,159 | 5/1973 | Gibson et al. | 264/29.1 X |
| 3,766,000 | 10/1973 | Gibson et al. | 428/389 X |
| 3,823,029 | 7/1974 | Rashid | 428/367 X |
| 4,169,911 | 10/1979 | Yoshida et al. | 428/408 |

*Primary Examiner*—Lorraine T. Kendell
*Attorney, Agent, or Firm*—Max Geldin

[57] ABSTRACT

Carbon fiber reinforced tantalum carbide composites are produced by vacuum infiltration of omni-weave carbon, e.g. three dimensional graphite, yarn preforms with an aqueous saturated solution containing tantalum fluoride and sucrose. Anhydrous ammonia is added under pressure, forming ammonium fluoride, which is removed by vacuum sublimation by application of heat. The resulting preform containing tantalum pentoxide and partially pyrolyzed sucrose is heated at high temperature and reduced pressure to decompose the sucrose to yield active carbon which reacts with the tantalum pentoxide to yield tantalum carbide and carbon monoxide. After repeated multiple infiltrations and processing, a composite is produced having a matrix of tantalum carbide or tantalum carbide and carbon, which is reinforced in three or more directions with high strength-high modulus carbon or graphite yarn, the amount of carbon in the matrix phase being a function of the amount of sucrose present in the aqueous solution of tantalum fluoride.

13 Claims, 4 Drawing Figures

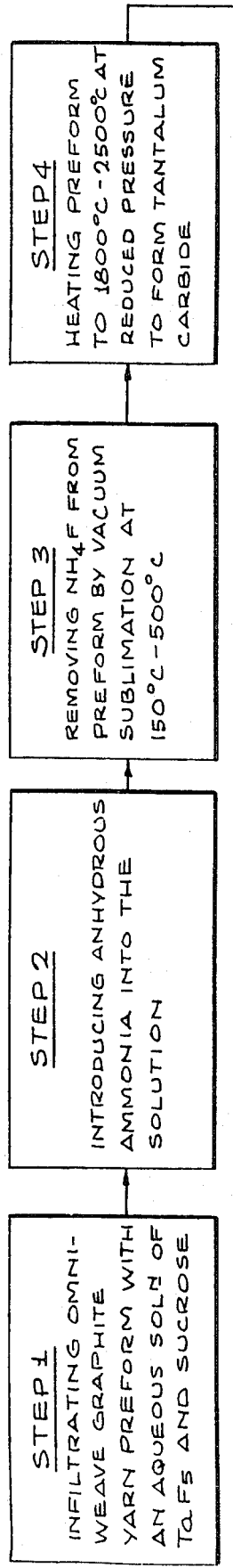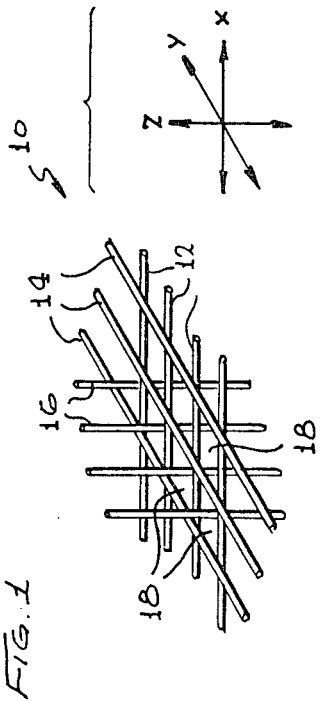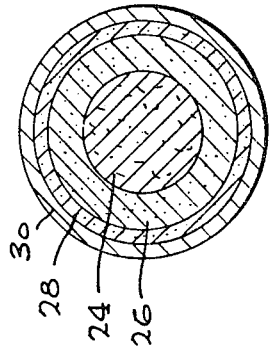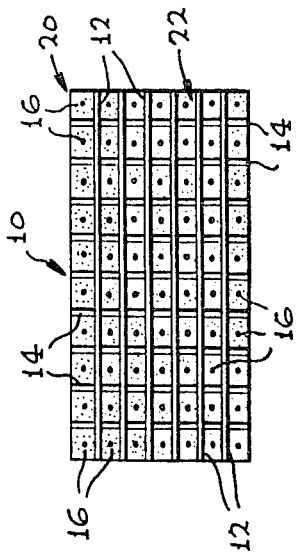

PRODUCTION OF CARBON FIBER-TANTALUM CARBIDE COMPOSITES

This is a division of application Ser. No. 942,485, filed Sept. 15, 1978, now U.S. Pat. No. 4,196,230.

BACKGROUND OF THE INVENTION

This invention relates to carbon fiber reinforced tantalum carbide composites, and is particularly concerned with procedure for producing omni-directional carbon or graphite fiber-tantalum carbide composites and which may also include carbon in the tantalum carbide matrix, employing a tantalum carbide precursor for infiltrating an omni-directional carbon or graphite yarn composite, and additional operational steps, without damaging the carbon or graphite fibers, and requiring a minimum number of infiltration cycles to substantially fill the voids of the preform.

The development of carbon-carbon composites formed of a carbon martrix containing high strength high modulus carbon fibers proceeded for many years despite the knowledge that the carbon matrix surrounding such fibers provides a poor matrix material for the composite in terms of strength, fiber bonding, particle erosion resistance, resistance to ablation, and the like.

To overcome these disadvantages various materials such as metals, oxides, metal carbides, metal borides, and other compounds have been incorporated into the carbon or graphite fiber reinforced composites. To a large degree many of these efforts have been unsuccessful due to gross damage of reinforcing fibers in compaction operations, thermodynamic incompatibility of fibers and matrices at fabrication and use temperatures, sometimes resulting in the dissolving of fibers, mismatch of the coefficients of thermal expansion and contraction between matrix and the reinforcing fibers, often resulting in fiber damage, and lack of sufficient bond between the matrix and the fiber, resulting in poor strength.

Illustrative of prior art composites are those disclosed in U.S. Pat. Nos. 3,736,159 and 3,766,000, comprised of graphite fibers dispersed in a matrix of a refractory metal compound such as tantalum carbide. The resulting composites are low thermal expansion composites.

SUMMARY OF THE INVENTION

One object of the present invention is to provide carbon fiber-tantalum carbide composites by procedure which does not damage the carbon or graphite fibers. Another object is the provision of procedure for producing carbon fiber-tantalum carbide composites having matching coefficients of thermal expansion and thermal contraction between the matrix and reinforcing fibers. A particular object of the invention is to provide improved procedure for the production of omni-directional or omni-weave graphite yarn-tantalum carbide composites by infiltration of omni-weave carbon or graphite yarn preforms with a tantalum carbide precursor, and utilizing additional operational steps which permit the introduction and impregnation of tantalum carbide into substantially the entire void volume of the preform using a minimum number of infilatration cycles and without damaging the graphite fibers. Still another object is the incorporation of a dense refractory metal such as tungsten, rhenium or tantalum, into such tantalum carbide composites.

The above objects and advantages are achieved according to the invention particularly by the use of tantalum fluoride ($TaF_5$) as a tantalum carbide precursor for infiltrating an omni-directional or omni-weave carbon or graphite fiber preform, particularly in conjunction with a sugar such as sucrose as a source of active carbon for producing the tantalum carbide. More specifically, an aqueous, preferably saturated, solution of tantalum fluoride and sucrose is infiltrated under vacuum into the carbon fiber preform. Anhydrous ammonia under pressure is added, converting the tantalum fluoride to ammonium fluoride and tantalum pentoxide. The ammonium fluoride is removed by vacuum sublimation from the preform as heat is applied, the sucrose being partially pyrolyzed in the process.

The resulting preform containing the tantalum pentoxide, more specifically tantalum pentoxide hydrate, and partially pyrolyzed sucrose, is then heated at elevated temperature and under reduced pressure to entirely decompose or pyrolyze the sucrose to form active carbon which reacts with the tantalum pentoxide, yielding tantalum carbide and carbon monoxide.

The resulting preform is infiltrated and processed as described above in a plurality of cycles until the voids of the preform have been substantially filled, to produce a composite comprised of a matrix of tantalum carbide or tantalum carbide and carbon, which is reinforced in three or more directions with high strength-high modulus carbon or graphite fiber or yarn. The amount of carbon contained in the matrix phase is a function of the amount of sucrose present in the infiltrating solution of tantalum fluoride precursor. Thus, where the amount of sucrose produces an amount of carbon which is approximately sufficient to react with all of the tantalum pentoxide to form tantalum carbide, only tantalum carbide will be present in the matrix. Any excess sucrose will result in the presence of carbon in the tantalum carbide matrix.

The use of tantalum fluoride as tantalum carbide precursor, particularly in combination with sucrose to produce a source of carbon for reaction with the tantalum pentoxide to form tantalum carbide, in conjunction with the other reaction conditions, avoids damage to the carbon or graphite fibers during processing, while at the same time minimizing the number of cycles of tantalum carbide precursor infiltration and processing required to substantially fill the voids of the carbon fiber preform, and resulting in a composite formed of a matrix of tantalum carbide reinforced with omni-directional carbon fibers or yarns.

As an additional feature of the invention, dense refractory metals such as tungsten, rhenium or tantalum can be incorporated into the tantalum carbide composite produced according to the invention, to impart erosion resistance, toughness and high density to the composite.

According to the invention, there is thus provided a process for producing a fiber-reinforced tantalum carbide composite which comprises the steps:

(a) infiltrating a multidirectional carbon fiber preform with an aqueous solution of tantalum fluoride and sucrose, (b) introducing anhydrous ammonia into said solution and forming tantalum pentoxide and ammonium fluoride, (c) removing said ammonium fluoride, and (d) heating the resulting infiltrated preform containing tantalum pentoxide and sucrose at elevated temperature and converting said sucrose to carbon and reacting said carbon with said tantalum pentoxide to form tantalum carbide.

Steps (a), (b), (c) and (d) are repeated in a plurality of cycles to substantially fill the voids of said preform with a matrix of tantalum carbide, or tantalum carbide and carbon.

THE DRAWINGS

FIG. 1 illustrates schematically a three-dimensional carbon or graphite yarn preform with the yarns in the three basic orthogonal directions;

FIG. 2 illustrates the basic steps of the invention process for producing the carbon yarn-tantalum carbide composites of the invention from the preform of FIG. 1;

FIG. 3 illustrates the resulting graphite yarn-reinforced tantalum carbide composite; and FIG. 4 is a schematic section of a tantalum carbide composite containing a high density refractory metal such as tungsten, rhenium or tantalum, according to another feature of the invention.

DETAILED DESCRIPTION OF THE INVENTION INCLUDING PREFERRED EMBODIMENTS

Various types of omni-directional or omni-weave carbon fiber or yarn preforms can be employed according to the invention for producing the composite of the invention. Thus, for example, omni-weave systems such as polar, four dimensional and seven dimensional preforms can be employed. Those are all commercially available types of preforms. However, the preferred omni-weave carbon or graphite yarn preforms for purposes of the invention are the three dimensional (3D) carbon yarns composite with the yarn or fibers in the three basic orthogonal directions, and preferably formed of high strength-high modulus carbon or graphite yarns. A preform of this type is illustrated in FIG. 1 of the drawing. It will be noted that the preform 10 is comprised of parallel X-yarns 12, disposed in a longitudinal direction, parallel Y-yarns 14, disposed in a transverse direction and parallel Z-yarns 16 disposed perpendicular to the X-Y plane and which are positioned within the squares 18 formed between adjacent X-yarns and adjacent Y-yarns.

The carbon fibers which can be used in producing the preform described above are preferably high strength-high modulus fibers and can include graphite fibers, amorphous carbon fibers and pyrolytic graphite fibers. The fibers can be in the form of single fibers or yarns consisting of many strands of fibers. Such fibers and yarns can, for example, be twisted and braided. The fiber diameter can range from about 1.0 μm (micron) to about 20.0 μm. Typical high strength-high modulus carbon fibers which can be employed in the above preforms are those marketed as "Thornel", e.g. Thornel-25, Thornel-50 and "Thornel" Type P Carbon Fiber-VSB-32 (11 μm in diameter).

In carrying out the process of the invention, as illustrated in FIG. 2 of the drawing, the carbon fiber preform of the type illustrated in FIG. 1 is a first treated or infiltrated with an aqueous solution containing tantalum fluoride and a source of reactive carbon which is soluble in water. For this purpose, sugars such as glucose, fructose, sucrose, maltose and lactose can be employed. Sucrose has been found to be particularly effective and is preferred. Accordingly, the invention is described hereinafter chiefly in terms of the use of sucrose.

For treatment with the aqueous tantalum fluoride precursor solution the preforms can be placed in a tantalum container with tantalum oxide ($Ta_2O_5$) spacers positioned between the carbon preforms and the container to prevent carburization of the tantalum containers. The tantalum container is placed in a vacuum/pressure type furnace and evacuated to a suitable pressure, e.g. ranging from $1 \times 10^{-3}$ to $1 \times 10^{-6}$ torr, while simultaneously preferably heating the container to a temperature ranging from about 400° C. to about 800° C., e.g. 500° C.

A predetermined volume of the aqueous solution of tantalum fluoride, $TaF_5$, and sucrose, as precursor liquid is introduced into the tantalum container and under vacuum, until the preforms contained in the container are covered with the solution. It is preferred that the aqueous solution be saturated with respect to tantalum fluoride precursor in order to impregnate or introduce as much of the tantalum fluoride precursor as possible into the carbon or graphite fiber preform during each cycle of treatment, as described below, and in order finally to completely impregnate the preform with tantalum carbide in a minimum number of infiltration cycles. However, the precursor solution need not be saturated with respect to tantalum fluoride, and the concentration thereof in the aqueous precursor solution can range from about 300 to about 800 grams per liter of solution, preferably in excess of 700 grams per liter. It is noted that a saturated solution of $TaF_5$ at room temperature (20°) contains about 765 grams $TaF_5$ per liter.

The amount of sucrose in the aqueous precursor solution can be varied as desired so as to obtain a final tantalum carbide composite in which the matrix can be substantially only tantalum carbide or tantalum carbide and carbon. As will be noted hereinafter, the sucrose functions as a source of carbon for the subsequent reaction with tantalum pentoxide, which produces the tantalum carbide, as well as functioning as a matrix carbon source. Thus, composites can be obtained according to the invention, containing tantalum carbide and varying proportions of carbon, as matrix, by varying the proportions of sucrose in relation to tantalum fluoride in the precursor solution, as shown by the table below.

TABLE 1

| $TaF_5$ (parts by wt) | Sucrose (parts by wt) | Composite Matrix (molar proportions) TaC + C |
|---|---|---|
| 1 | 0.6 | 1 + 0 |
| 1 | 0.72 | 1 + 0.67 |
| 1 | 0.78 | 1 + 1 |

The table above shows that at least a weight ratio of sucrose to $TaF_5$ of 0.6 in the precursor solution is required to completely convert the $TaF_5$ ultimately to TaC, without any excess carbon being present in the composite. A weight ratio of sucrose to $TaF_5$ in excess of the above ratio will provide excess carbon over the amount stoichiometrically required to produce tantalum carbide. A weight ratio of sucrose to $TaF_5$ of 0.72 produces a composite matrix having a ratio of 1 mol of TaC to 0.67 mol carbon, and a corresponding weight ratio of 0.78 producing a composite matrix having a ratio of 1 mol of $TaC_5$ to 1 mol of carbon, exclusive of carbon fibers.

Thus, the ratio by weight of sucrose to tantalum fluoride which is employed in the precursor solution for producing TaC with and without additional carbon can range from about 0.6 to about 0.78.

Under certain conditions where it is desired to incorporate tantalum metal into the TaC composite, as described hereinafter, the weight ratio of sucrose to tantalum fluoride in the precursor solution is 0.43.

Anhydrous ammonia ($NH_3$) under substantial pressure, which can range from about 600 psi to about 2,000 psi, e.g. at 1,600 psi, is introduced into the vacuum/pressure furnace containing the tantalum container for a period sufficient to cause the ammonia to react with the tantalum fluoride in the precursor solution to form ammonium fluoride and tantalum pentoxide according to the following general reaction:

$$TaF_5 \cdot H_2O + NH_3 \rightarrow Ta_2O_5 + NH_4F$$

The tantalum fluoride reactant, designated $TaF_5 \cdot H_2O$, contains water of solution, rather than chemically combined water. The tantalum pentoxide produced in the reaction is in the form of a hydrate, designated $Ta_2O_5 \cdot xH_2O$, the x value varying depending on factors such as temperature and time of reaction.

The tantalum container is then heated to temperatures ranging from about 150° to about 500° C., to affect vacuum sublimation of the ammonium fluoride from the preform, the resulting gases being evacuated from the furnace.

If desired, additional anhydrous ammonia can be introduced into the furnace to assure neutralization of any residual tantalum fluoride not previously reacted, followed by additional vacuum sublimation at a somewhat higher temperature, e.g. at 800° C., of any additional ammonium fluoride formed.

In preferred practice the infiltration with precursor solution, ammonia treatment and ammonium fluoride sublimation steps are repeated for several cycles, e.g. at least about 4 or 5 cycles. At this point the preforms now impregnated with tantalum pentoxide-hydrate and partially pyrolyzed sucrose, are heated in the furnace at temperature ranging from about 1,400° to about 2,500° C., preferably about 1,800° to about 2,500° C. and at reduced pressure, e.g. of the order of about 1 to about 200 microns for a period sufficient to decompose the sucrose completely to yield highly active carbon. The resulting carbon thus formed reacts with the tantalum pentoxide to yield tantalum carbide and carbon monoxide, according to the general reaction noted below:

$$Ta_2O_5 + 7C \rightarrow 2TaC + 5CO$$

Depending upon the ratio of sucrose present in relation to the tantalum fluoride in the initial precursor solution, as noted above, excess carbon may or may not be present in the final tantalum carbide matrix.

The resulting preform now impregnated with some tantalum carbide or tantalum carbide with some carbon, is again subjected to infiltration with precursor solution followed by the additional steps of the process noted above, for several additional cycles, and for a total of at least eight cycles including the high temperature treatment, e.g. at 1,800° C. following the subsequent fourth or fifth infiltration cycle, for incorporation of additional tantalum carbide, as well as additional carbon, if desired, into the preform, and these cycles can be repeated until substantially all, e.g. 90% of more, of the void volume of the initial carbon fiber preforms are filled or impregnated with tantalum carbide, or tantalum carbide and carbon.

The reason for carrying out several, e.g. four or five, low temperature cycles, before proceeding to the high temperature, e.g. 1,800° C. carbothermic reduction of $Ta_2O_5$ to TaC is essentially a time saving feature. Thus, three low temperature cycles can be made in about the length of time that is required for one 1,800° C. cycle. The high temperature, e.g. 1,800° C.,-carbothermic reduction cycle is required about every fourth or fifth cycle to decrease the volume of $Ta_2O_5$ and carbon, and to increase preform porosity.

After such multiple infiltrations and processing, and referring to FIG. 3 of the drawing, a composite 20 is produced which has a matrix 22 of tantalum carbide and which may also contain carbon, such matrix being reinforced in three or more directions with high strength-high modulus graphite yarn, as provided by the preform 10.

In carrying out the invention process, it was noted by performing tests on impregnated and processed yarns, that damage to the fibers or yarns of the preforms by contact with tantalum fluoride, $NH_4F$, any HF or $NH_4OH$, is minimal, and that the preforms can be filled with the tantalum carbide or tantalum carbide-carbon matrix by application of about 10 to about 20 total cycles of infiltration with precursor solution and further processing, as noted above, depending on original preform void volume. Where carbon is present in the tantalum carbide matrix, the amount of tantalum carbide and carbon present in the final composite can range from about 25 to about 60 v/o (volume percent) tantalum carbide, and about 5 to about 20 v/o matrix carbon, and about 30 to about 55 v/o being carbon from the carbon yarns in the preform. It will be understood that there will be some minor residual porosity or void volume in the final composite.

Scanning electron micrographs of the composite containing a matrix of tantalum carbide and matrix carbon clearly indicates that the TaC crystallites are surrounded by matrix carbon as the continuous phase, derived from the sucrose. It has been found that a major volume percentage (v/o) of the matrix can be TaC crystallites surrounded by only a minor volume percentage of continuous carbon phase. Thus, a typical composite according to the invention can consist of 60 v/o TaC, 10 v/o sucrose derived carbon and 30 v/o carbon yarn preform. In this composite 86 v/o of the matrix $$\left(\frac{60}{60 + 10}\right)$$

are TaC crystallites and only 14 v/o of the matrix carbon $$\left(\frac{10}{60 + 10}\right)$$

is continuous carbon phase.

The following are examples of practice of the invention:

EXAMPLE 1

A 3D orthogonal carbon yarn preform of Union Carbide consisting of "Thornel" Type P carbon fiber -VSB-32 (11 μm in diameter) was used for producing tantalum carbide composites. Several preforms of the above type were placed in a thin wall tantalum container open at the top and with approximately 3 inches of container wall above the preforms.

The following steps of the procedure were then carried out:

1. The tantalum container was placed in a vacuum/pressure type furnace and evacuated to a pressure of $10^{-4}$ to $10^{-5}$ torr, while simultaneously heating the furnace to a minimum of 500° C. Small thin blocks of $Ta_2O_5$ were used as spacers between the carbon yarn preforms and the tantalum container. The vacuum pump was stopped and the valve closed on the vacuum line.

2. A predetermined volume of precursor liquid, containing about 765 grams of $TaF_5$ and about 554 grams of sucrose, per liter of solution was forced at ambient pressure into the tantalum can containing the preforms while still under vacuum, until the preforms were covered with liquid, with an additional amount of precursor liquid of about 10% of the preforms volume being introduced.

3. The furnace was pressurized with anhydrous ammonia to about 1,600 psi, and the vessel allowed to stand until the loss in pressure stabilized, indicating completion of the conversion of tantalum fluoride to tantalum pentoxide.

4. The tantalum container was heated to 200° C. while evacuating sublimed ammonium fluoride gases and until most of the water was removed in addition to residual ammonium hydroxide and/or $NH_3$.

5. The vessel was opened, the tantalum container and preforms were removed and excess solids (tantalum pentoxide, carbon and ammonium fluoride) removed from the inside of the container and the surfaces of the preforms, in order to remove any barrier or skin which would prevent $NH_3$ from penetrating the structure in the next step (6).

6. The resulting preforms were again placed in the tantalum container, and the container placed in the vacuum-pressure furnace, which was then evacuated to $10^{-3}$ torr, and then pressurized to 500 psi, with anhydrous ammonia to assure neutralization of any residual tantalum fluoride not previously reacted. The furnace was then heated to 800° C. while evacuating to a pressure of $10^{-4}$ to $10^{-5}$ torr.

7. The steps noted above were repeated for a number of cycles, except that after about every fourth cycle the last mentioned heating step was carried out at 1,600° C. and about 5 microns pressure to completely pyrolyze the sucrose to form carbon and to convert the tantalum pentoxide to tantalum carbide.

Eight cycles of infiltration with $TaF_5$-sucrose precursor solution, treatment with ammonia, and sublimation (steps 1 to 6) were carried out, with heating to 1,600° C. every fourth cycle. The resulting composite contained about 30 v/o tantalum carbide, about 7.5 v/o matrix carbon, about 30 v/o 3D orthogonal yarn and 32.5 v/o void volume.

Continuing the above procedure for an additional 12 cycles produces a composite containing 55 v/o TaC, 10 v/o matrix carbon, 30 v/o 3D orthogonal yarn and 5 v/o void volume.

EXAMPLES 2 AND 3

The procedure of Example 1 was essentially followed but with the following variations in the steps of the procedure noted in the table below:

TABLE 2

| Process Step No. | Example 2 | Example 3 |
|---|---|---|
| 1 | VAC - $1 \times 10^{-3}$ torr 400° C. | $1 \times 10^{31\ 6}$ torr 800° C. |
| 2 | precursor liquid 765 grams $TaF_5$ and 599 grams sucrose, per liter | precursor liquid 765 grams $TaF_5$ and 465 grams sucrose, per liter |
| 3 | 800 psig - $NH_3$ | 1,000 psig - $NH_3$ |
| 4 | 150° C. | 500° C. |
| 6 | 300 psig - $NH_3$ 400° C. $1 \times 10^{-3}$ torr | 1,600 psig - $NH_3$ 1,000° C. $1 \times 10^{31\ 6}$ torr |
| 7 | 1,400° C.; 100 microns 4 cycles | 1,800° C.; 1 micron 4 cycles |

The resulting composite of Example 2 contained about 15 v/o tantalum carbide and about 15 v/o matrix carbon, 30 v/o yarn and 40 v/o void volume.

The resulting composite of Example 3 contained about 30 v/o tantalum carbide and about 0 v/o matrix carbon, 30 v/o yarn and 40 v/o void volume.

Continuing the above procedure for an additional 16 cycles produces in the case of Example 2, a composite containing 30 v/o TaC, 30 v/o matrix carbon, 30 v/o yarn, and 10 v/o void volume; and in the case of Example 3, a composite containing 60 v/o TaC, 0 v/o matrix carbon, 30 v/o yarn, and 10 v/o void volume.

It has been recognized heretofore that an ideal erosion resistant composite would result if a carbon yarn preform could be infiltrated with a dense refractory metal, e.g. tungsten, rhenium or tantalum, since these metals exhibit very high erosion resistant properties. However, tungsten and tantalum cannot be infiltrated directly because they would react with the carbon or graphite fibers to form tungsten carbide and tantalum carbide and would destroy the fiber properties. Further, although rhenium does not form a carbide, it is known that its melting point changes from about 3,100° C. to 2,500° C. when heated in the presence of carbon. This reduction in melting point could adversely affect the high temperature ablation properties of the composite.

The present invention provides a means to infiltrate the metals, W, Re and Ta, into the carbon fiber or carbon yarn preform. Such infiltration or impregnation is achieved following production of the tantalum carbide composite produced according to the invention. Such infiltration can be successfully accomplished because the carbon fibers of the preform are now completely coated with the tantalum carbide, and such tantalum carbide matrix or coating over the carbon fibers will provide an effective diffusion barrier material to prevent any reaction between the carbon in the fiber and these refractory metals. According to preferred procedure, the preform can be impregnated first with a matrix of tantalum carbide and carbon, followed by further impregnation with tantalum carbide alone, after which the preform is impregnated with one or more of the above refractory metals, e.g. tantalum. Alternatively, the preform can be impregnated first with tantalum carbide alone, followed by impregnation with one or more of such refractory metals.

The following are examples of this additional feature.

EXAMPLE 4

The process of Example 1 is repeated for 10 cycles of infiltration with precursor solution and further processing steps, with heating to 1,600° C. every fifth cycle, as described therein to impregnate the carbon yarn preform and coat the fibers with a coating of tantalum carbide and carbon in a mole ratio of 1 mole of TaC and 0.67 mole carbon.

The process is repeated for 5 more cycles, but the amount of sucrose in the precursor solution is reduced to 465 grams per liter, to impregnate the preform and provide an overcoat for the fibers of tantalum carbide only.

The process is continued for five additional cycles, but further reducing the amount of sucrose in the precursor solution to 333 grams per liter. The amount of carbon thus derived from the sucrose is only sufficient to reduce the tantalum pentoxide to tantalum metal according to the following reaction:

$$Ta_2O_5 + 5C \rightarrow 2Ta + 5CO$$

The resulting composite structure is illustrated schematically in FIG. 4 showing a sectional view of the respective coatings around a yarn of the composite. Numberal 24 is a carbon yarn of the preform which is covered with a first coating 26 of tantalum carbide and carbon in a molar ratio of 1 to 0.67 (TaC:0.67C), over which is a second coating 28 of tantalum carbide, followed by an outer coating 30 of tantalum metal. Thus, the final coating is a continuous phase coating of tantalum, which imparts to the composite, ductility, toughness and high density. All of these properties are desirable for providing a composite having high strength and high erosion resistance.

EXAMPLE 5

The procedure of Example 4 is repeated through formation of the tantalum carbide coating 28.

To impregnate the resulting composite or to form an outer coating 30 of Re, the rhenium is infiltrated using $Re_2O_7$ in solution and heating at temperature of 600° C. with flowing hydrogen to reduce the rhenium oxide to rhenium metal, as indicated by the reaction:

$$Re_2O_7 \cdot H_2O + H_2 \xrightarrow{600° C.} Re + H_2O$$
(solution)

EXAMPLE 6

The procedure of Example 4 is repeated through formation of the tantalum carbide coating 28.

Tungsten metal is then infiltrated using ammonium paratungstate in solution and heating at temperature of 600° C. with flowing hydrogen to reduce the tungstate to tungsten metal.

If desired, mixtures of rhenium and tungsten can be infiltrated or impregnated into the tantalum carbide composite using the procedure of Examples 5 and 6.

EXAMPLE 7

The process of Example 1 is repeated for 10 cycles of infiltration with precursor solution and further processing steps, with heating to 1,600° C. every fifth cycle, as described therein to impregnate the carbon yarn preform and coat the fibers with a coating of tantalum carbide only, by using 465 grams of sucrose per liter in the $TaF_5$ precursor solution.

The process is continued for five additional cycles, but further reducing the amount of sucrose in the precursor solution to 333 grams per liter. The amount of carbon thus derived from the sucrose is only sufficient to reduce the tantalum pentoxide to tantalum metal.

The resulting composite structure is similar to that of FIG. 4, except that the first coating of tantalum carbide and carbon is omitted, and is replaced by a coating of tantalum carbide alone, followed by an outer second coating of tantalum metal.

It is noted that when employing tantalum cans as containers, such containers when damaged can be dissolved in HF to produce tantalum fluoride for precursor feed stock. Also, any solid materials removed in the process such as tantalum oxide can be dissolved in HF to produce additional tantalum fluoride. The use of tantalum containers and tantalum oxide spacers do not contaminate the system.

The invention process accordingly has a number of novel features. These include the use of tantalum fluoride as a tantalum carbide precursor which can be used without damaging the graphite fibers. The use of sucrose in combination with tantalum fluoride produces a highly dispersed highly reactive fugitive carbon source which reacts with the oxygen and tantalum in tantalum pentoxide, and also functions to provide a matrix carbon source. The use of anhydrous ammonia at high pressure, e.g. 1,600 psi, to neutralize the fluorine in $TaF_5 \cdot H_2O$ is a novel feature, it being noted that $NH_4OH$ would not be operative because tantalum pentoxide is soluble in bases. The vacuum sublimation of ammonium fluoride according to the invention does not damage the graphite fibers at the processing temperatures and pressures noted above.

Further, the use of tantalum metal containers for the carbon or fiber yarn preforms for infiltration thereof prevents corrosion to processing equipment and contamination of the tantalum fluoride-sucrose infiltration solution, and damaged or thin tantalum containers can be dissolved in HF to produce fresh tantalum fluoride precursor solutions. The carbon content in the tantalum carbide matrix of the carbon fiber-tantalum carbide composite produced according to the invention can be readily controlled by the amount of sucrose present in the infiltration solution.

From the foregoing, it is seen that the invention affords novel procedure for providing multi-directional carbon fiber-tantalum carbide composites by employing an infiltration solution for the multi-directional or omni-weave carbon fiber preforms, containing tantalum fluoride as a tantalum carbide precursor, and sucrose as a carbon source, and employing a plurality of procedural steps including pressures and temperatures, which avoid damage to the reinforcing carbon fibers, while permitting infiltration of the carbon fiber preforms with tantalum carbide or tantalum carbide and carbon, as matrix, in a relatively low number of infiltration and processing cycles. The invention also provides novel procedure for introducing refractory metals such as tantalum, rhenium and tungsten into the tantalum carbide composite produced according to the invention, without reacting with or damaging the carbon fibers of the composite, to form a novel tantalum carbide-refractory metal composite having high erosion resistance.

The carbon fiber-tantalum carbide composites produced according to the invention are high strength dense composites particularly useful as structural components which are subjected to varying temperature conditions and thermal cycling, and have low thermal expansion. Thus, the composites of the invention can be employed as nose tip materials for space vehicles and are resistant to mechanical erosion which can be caused by particles of ice, rain and dust in the atmosphere, and also are resistant to ablation caused by re-entry heating of such nose tips.

While we have described particular embodiments of the invention for the purpose of illustration within the spirit of the invention, it will be understood that the invention is not to be taken as limited except by the scope of the appended claims.

What is claimed is:

1. An erosion resistant high strength composite consisting essentially of carbon fibers impregnated or coated with a first coating of tantalum carbide and carbon, a second coating of tantalum carbide overlying said first coating and a third continuous phase coating of a refractory metal overlying said second coating and forming the matrix of said composite, said refractory metal selected from the group consisting of tantalum, rhenium and tungsten.

2. The composite as defined in claim 1, said carbon fiber being in the form of a multidirectional carbon fiber preform.

3. The composite as defined in claim 1, said carbon fiber being in the form of a three dimensional orthogonal carbon yarn preform.

4. The composite as defined in claim 2, said refractory metal being tantalum.

5. The composite as defined in claim 3, said refractory metal being tantalum.

6. The composite as defined in claim 1, said refractory metal being tantalum.

7. The composite as defined in claim 1, said refractory metal being rhenium.

8. The composite as defined in claim 1, said refractory metal being tungsten.

9. The composite as defined in claim 1, said refractory metal being a mixture of rhenium and tungsten.

10. An erosion resistant high strength composite consisting essentially of carbon fibers impregnated or coated with a first coating of tantalum carbide and a second continuous phase coating of a refractory metal overlying said first coating, and forming the matrix of said composite, said refractory metal selected from the group consisting of tantalum, rhenium and tungsten.

11. The composite as defined in claim 10, said refractory metal being tantalum.

12. An erosion resistant high strength composite comprising a matrix of a refractory metal selected from the group consisting of tantalum, rhenium and tungsten, and a multiplicity of carbon fibers in said matrix, said carbon fibers impregnated or coated with a first coating of tantalum carbide and carbon, and a second coating of tantalum carbide overlying said first coating, said matrix metal forming a continuous phase coating over said second coating.

13. An erosion resistant high strength composite comprising a matrix of a refractory metal selected from the group consisting of tantalum, rhenium and tungsten, and a multiplicity of carbon fibers in said matrix, said carbon fibers impregnated or coated with a coating of tantalum carbide, said matrix metal forming a continuous phase coating over said tantalum carbide coating.

* * * * *